United States Patent
Schnitzer et al.

(10) Patent No.: US 8,674,998 B1
(45) Date of Patent: Mar. 18, 2014

(54) SNAPSHOT KEYFRAMING

(75) Inventors: Adam Schnitzer, Petaluma, CA (US); Steve Sullivan, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 778 days.

(21) Appl. No.: 12/231,253

(22) Filed: Aug. 29, 2008

(51) Int. Cl.
G06T 13/00 (2011.01)

(52) U.S. Cl.
USPC .......................................... 345/475; 345/951

(58) Field of Classification Search
USPC .................................. 345/473, 475, 949, 951
See application file for complete search history.

(56) References Cited

U.S. PATENT DOCUMENTS

| | | | | |
|---|---|---|---|---|
| 5,307,456 A | * | 4/1994 | MacKay | 715/782 |
| 6,329,994 B1 | * | 12/2001 | Gever et al. | 345/473 |
| 6,476,802 B1 | * | 11/2002 | Rose et al. | 345/419 |
| 6,664,966 B1 | * | 12/2003 | Ibrahim et al. | 345/474 |
| 6,686,918 B1 | * | 2/2004 | Cajolet et al. | 345/473 |
| 2002/0158905 A1 | * | 10/2002 | Bazzoni et al. | 345/760 |
| 2003/0146915 A1 | * | 8/2003 | Brook et al. | 345/473 |
| 2004/0130566 A1 | * | 7/2004 | Banerjee et al. | 345/716 |
| 2006/0022983 A1 | * | 2/2006 | Gauthier et al. | 345/473 |
| 2007/0002057 A1 | * | 1/2007 | Danzig et al. | 345/473 |
| 2008/0178087 A1 | * | 7/2008 | Fitzgibbon et al. | 715/723 |
| 2009/0147010 A1 | * | 6/2009 | Russell et al. | 345/473 |

OTHER PUBLICATIONS

FrameForge 3D Studio 2—The Power of Previz [online], (retrieved on Aug. 29, 2008). Retrieved from the Internet: <URL: http://www.frameforge3d.com/overview.php>.

* cited by examiner

Primary Examiner — Kee M Tung
Assistant Examiner — Michelle Chin
(74) Attorney, Agent, or Firm — Kilpatrick Townsend & Stockton LLP

(57) ABSTRACT

The present disclosure includes, among other things, systems, methods and program products for generating animation keyframes and a corresponding 3D animation sequence from a plurality of 2D images.

32 Claims, 9 Drawing Sheets

SNAPSHOT KEYFRAMING

BACKGROUND

Previsualizition techniques are techniques that are generally used in the film making industry to quickly and cheaply build mockups of scenes that will later be filmed on set. Prior techniques included placing proxy representations such as toys or other models in position relative to one another. The proxies would then be manipulated by hand to stage the action of a particular scene.

Current computing techniques for previsualization include software applications that allow a user to place one or more representations into a 3-dimensional (3D) environment representing the appropriate scene. The user then animates the representations by creating one or more keyframe animations for any of the representations in the 3D scene. The keyframe animations are used to specify the motions of the particular representations that are used to stage the actions of a particular scene.

Current techniques for creating keyframe animations require users to manipulate a 3D scene by posing characters and staging action while at the same time being mindful of the sequential timing of the action between keyframes.

SUMMARY

In general, one or more aspects of the subject matter described in this specification can be embodied in one or more methods that include generating a plurality of 2D images of a 3D scene, each image including a representation of one or more objects in the 3D scene, associating each image with a distinct point or period of time in the timeline, and for each image, generating an animation keyframe in the 3D scene for the objects represented in the image corresponding to the distinct point or period of time in the timeline. Other embodiments of this aspect include corresponding systems, apparatus, and computer program products.

These and other embodiments can optionally include one or more of the following features. Associating the image with a distinct point or period of time in the timeline can include receiving a request to associate an image with a distinct point or period of time in the timeline and performing the associating in response to the request. Generating an animation keyframe can include receiving a request to export the image into a 3D environment and for each image, exporting metadata associated with the image. Generating a 2D image of the 3D scene can include identifying one or more keyframe attributes for the one or more objects represented by the image, generating the image from the perspective of a virtual camera, and associating the keyframe attributes with the image. Generating a 2D image of the 3D scene can include generating a partially transparent representation of one of the plurality of images and combining the partially transparent representation with a presentation of the 3D scene. Generating an animation keyframe for an image can include accessing the keyframe attributes associated with the image frame and determining, for the one or more objects in the image frame, an animation keyframe according to the keyframe attributes. Determining an animation keyframe can include determining an animation keyframe according to a stepped tangent representation of the keyframe attributes. The one or more aspects can also include generating a 3D animation sequence corresponding to the plurality of 2D images, a virtual camera, and the animation keyframes. The one or more aspects can also include associating one or more of the plurality of images with a new distinct point or period of time in the timeline, wherein associating one or more of the plurality of images with the new distinct point or period of time can generate an alternate timeline and for each image in the plurality of images, generating a new animation keyframe for the objects represented in the image corresponding to the image's distinct point or period of time in the alternate timeline. The one or more aspects can also include accessing an image in the plurality of images, generating an alternate image of the accessed image, replacing the accessed image with the alternate image in the timeline, and for each image in the plurality of images, generating an animation keyframe for the objects represented in the image corresponding to the image's distinct point or period of time in the timeline.

Particular embodiments of the subject matter described in this specification can be implemented to realize one or more of the following advantages. Timing considerations can be decoupled from shot composition by allowing users to take snapshots of a 3D scene in any order and then interactively arrange those snapshots along a timeline to create an animatic that can be automatically converted into a keyframe animation without the user having to manage keys in an animation timeline. Additionally, by removing timing considerations from shot composition, it is easier to create an animatic. By automatically generating animation keyframes from 2D images, a reduction in the learning curve and technical acumen required to produce 3D animation sequences can be realized. A partially transparent representation of a previous snapshot with the presented 3D scene can be combined with a previous snapshot providing an intuitive presentation of the differences between the two. This allows a user to quickly determine poses for the presented 3D scene according to the previous poses of the presented snapshot. Users can reload snapshots, reposition objects therein and take an alternate snapshot, allowing the user to refine previously taken snapshots with minimal effort. The timing information of the animation sequence can be changed without modifying the 2D images by rearranging representations of the 2D images along the timeline.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference numbers and designations in the various drawings indicate like elements.

DETAILED DESCRIPTION

Figure 1A:
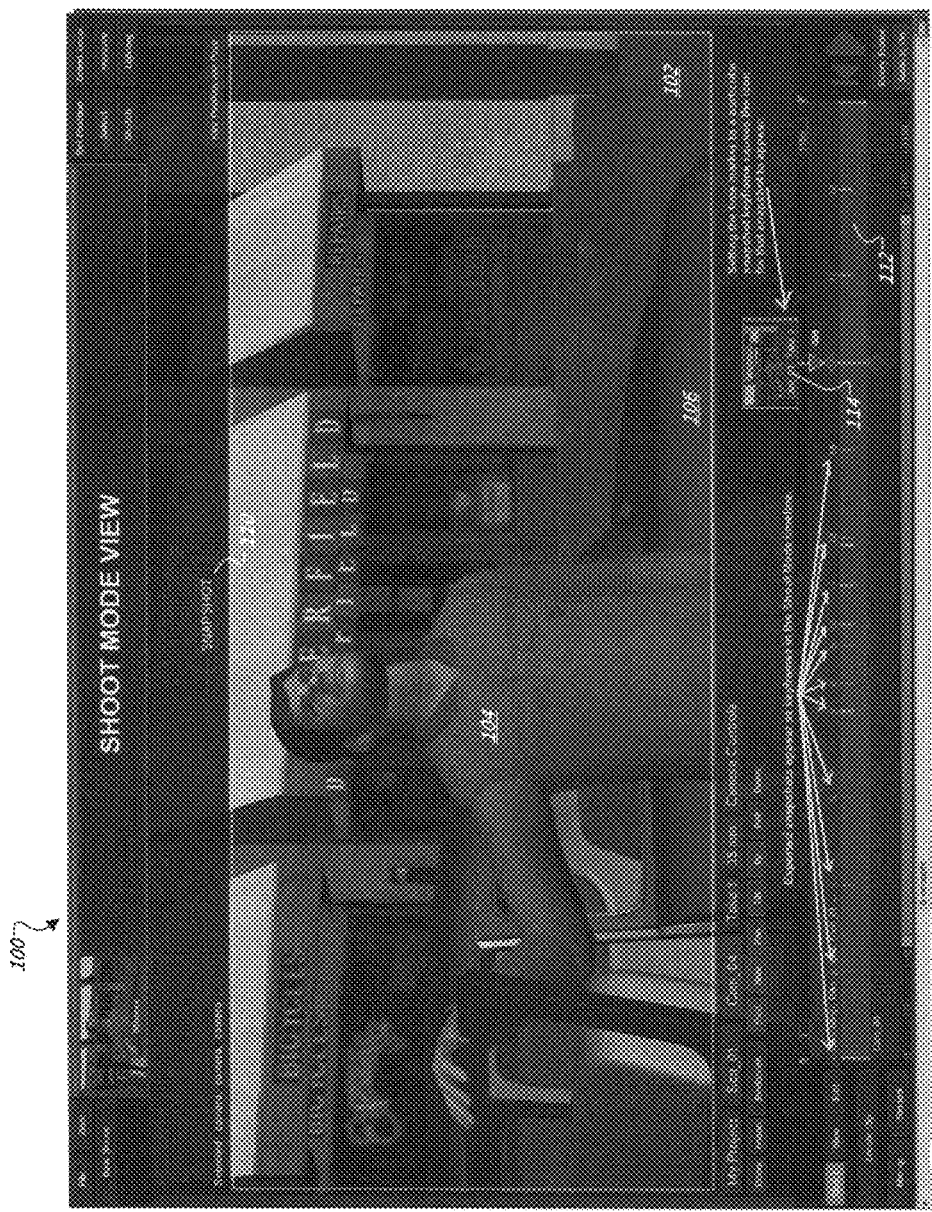
FIGS. 1A-1C are screenshots showing an example application that can generate animation keyframes and a corresponding 3D animation sequence from a plurality of 2D images.
Figure 1B:
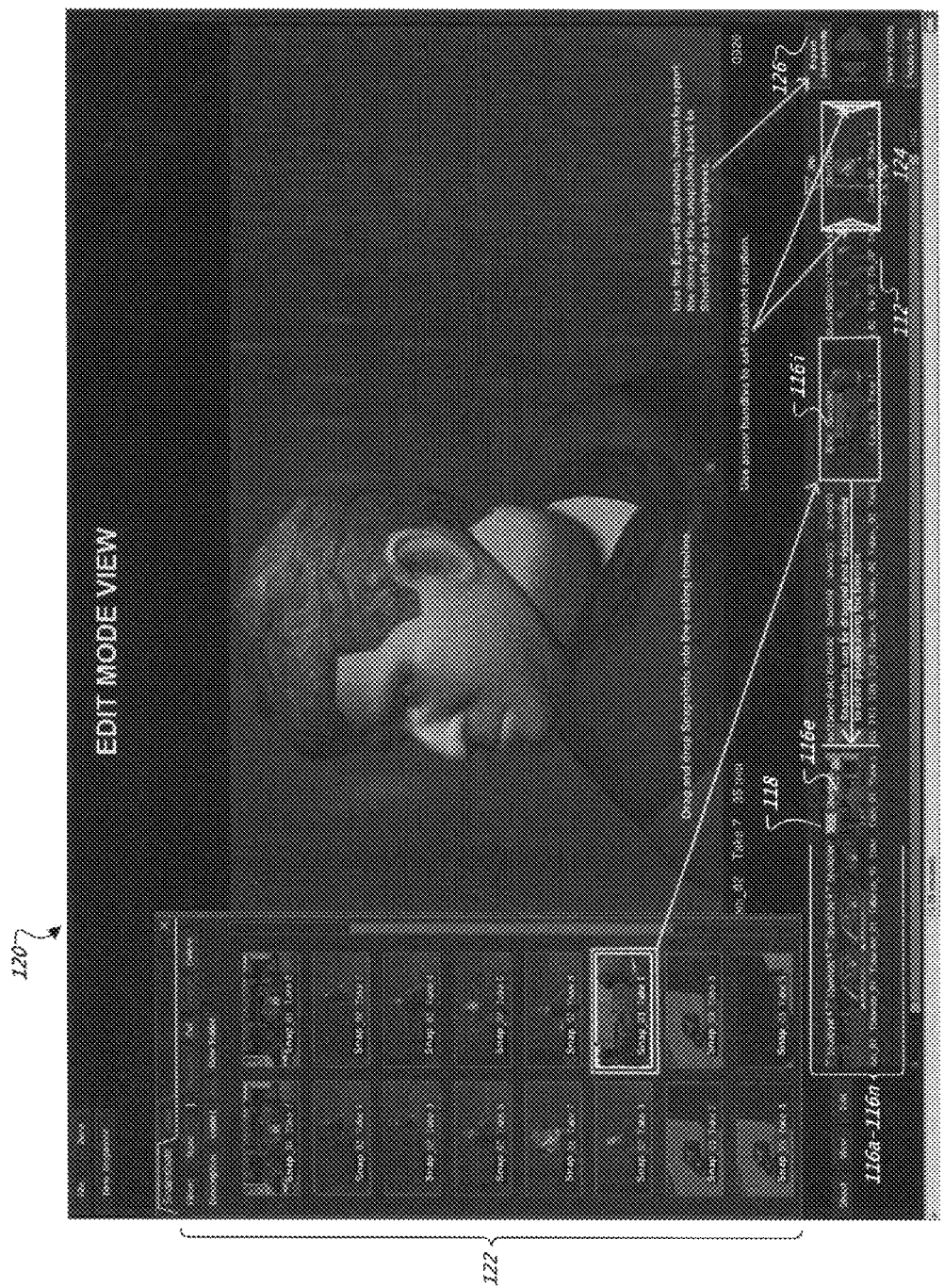
Figure 1C:

FIGS. 1A-1C are screenshots 100, 120, and 140, respectively showing an example application that can generate animation keyframes and a corresponding 3D animation sequence from a plurality of 2D images. In general, the example application can be used to provide a user with a previsualization of a scene (e.g., a movie scene, a television scene, or other scenes). For example, as illustrated by FIG. 1A, a 3D scene 102 involving an actor and a car is presented. In addition, the application is configured to be stored on and executed by a system described in more detail below. In general, the user (e.g., a movie director) of the application can use previsualization techniques to efficiently stage the action of one or more scenes, review the scenes and make modifications as appropriate. In other words, by using the previsualization application, the user can generate a storyboard for a feature film, television show, animation sequence in a video game, or other forms of media. For example, the user can position, pose, or otherwise manipulate one or more objects in the 3D scene and generate a plurality of 2D images corresponding to the manipulations to generate an animatic. In general, an animatic is a sequence of 2D images. For example, the images corresponding to a storyboard can be combined to generate an animatic. Used herein "object" is used generically to described any asset of the 3D scene, including but not limited to, one or more virtual cameras, one or more audio snippets, one or more lighting parameters (e.g., position, direction, intensity, and the like) and one or more representations of items presented in the 3D scene (e.g., one or more 3D geometries, textures, and the like), to name a few examples. In general, a 3D scene can be represented in memory, one or more files, or combinations thereof.

For example, as illustrated by FIG. 1A, a virtual car 106, and a virtual actor 104 are in the 3D scene 102. In some implementations, parameters describing the actor 104 and/or the car 106 can be loaded from a file and stored in memory when the actor 104 and/or car 106 are placed in the scene. In other implementations, parameters describing the actor 104 and/or car can be loaded from a file and stored in memory prior to when the actor 104 and/or car 106 are placed in the scene. In addition, the user has posed the actor 104 in a manner consistent with how an actor (e.g., a live actor or an animated actor) would act when the scene is filmed. The application can generate a plurality of 2D images from the 3D scene. For example, the user can manipulate the objects in the 3D scene as appropriate and select the snapshot button 110. In response, the application generates a 2D representation (e.g., a 2D image) of the 3D scene. In general, the 2D image is generated from the viewpoint of one or more virtual cameras. In general, a virtual camera can include various parameters (e.g., field of view, focal length, position, and the like). In addition, a virtual camera can be configured to track with the motion of objects within a 3D scene. For example, as an object moves away from the virtual camera, the virtual camera can pursue the object to maintain a predetermined distance between the virtual camera and the object. To generate a 2D image, the user can select a virtual camera as the scene's camera and select the snapshot button 110. In response, the application generates the 2D image from viewpoint of the selected virtual camera. The 2D image can be added to the plurality of images 122. For example, in reference to FIG. 1B, a 2D image can be added to the plurality of images 122 when a snapshot is generated (e.g., when the snapshot button 110 is selected). Furthermore, the application generates a representation of the 2D image and places it in a snapshot timeline 112. For example, as illustrated by the example in FIG. 1A, each of the 2D images is shown as a tick mark in the timeline 112. In addition, in some implementations, when a tick mark is selected, a thumbnail of the 2D image is shown (e.g., as illustrated by thumbnail 114).

Moreover, during the generation of the 2D image, the application can also generate one or more animation keyframes. In general, an animation keyframe describes the pose of an object. In some implementations, the animation keyframe is an animation curve. By selecting a point on the curve, the object is posed according to the parameters associated with that particular point on the curve (e.g., x-axis position, y-axis position, and/or z-axis position of the object). Each animation keyframe can be determined from one or more identified keyframe attributes. In general, a keyframe attribute is a value that describes a change in one or more of the object's parameters appropriate for the behavior of a particular object. For example, an object representing an actor may include delta-x, delta-y, and delta-z keyframe attributes that describe a change in position from one animation frame to the next. As another example, an object representing a light source may include values corresponding to the change in light (e.g., change in intensity, change in color, and the like). Generating animation keyframes and identifying keyframe attributes are described in more detail below.

In reference to FIG. 1B, as illustrated by timeline 112; generated 2D images can be associated with distinct points or periods of time. For example, in some implementations, images 116a-116n are arranged in the timeline 112 and in response to the arranging, distinct period of times are associated with the respective images. As another example, images from the plurality of images 122 can be assigned to the timeline 112 by dragging any of the images 122 onto the timeline 112. Moreover, the timeline 112 can include a representation of the duration of the scenes in the 3D animation sequence. For example, the timeline 112 includes bounding boxes (e.g., bounding box 118) around images 116a-116n, that represents a duration of time in the 3D animation sequence when the respective images are presented. That is, in general, a distinct point in time represents a position in the timeline 112, while a distinct period of time in the timeline 112 represents both a position in the timeline 112 and a duration of time in the timeline 112. In the depicted example of FIG. 1B, distinct periods of time are being used, however, distinct points of time may also be used, according to particular implementations. For example, the images 116a-116n may specify a location in the timeline but not a duration. As such when describing distinct periods of time in this specification, distinct points of time may also be used, according to particular implementations. The distinct period of time is used when generating the 3D animation sequence. For example, the distinct period of time specifies how long and in what order, particular scenes are presented during the 3D animation sequence. In the example of FIG. 1B, the distinct periods of time can be modified by arrow handles that flank representations in the timeline 112. For example, a user can click and drag on the arrow handles 124 to increase or decrease the duration of the distinct period of the time for the respective 2D image.

The example application can automatically generate a 3D animation sequence corresponding to the animation keyframes generated from the 2D images. The application can receive a request to export the plurality of 2D images into a 3D animation sequence. For example, a user can select the export button 126 to export the images 116a-116n in the timeline 112 into a 3D animation sequence. In response, the application can generate an animation keyframe for one or more objects represented in each image of the plurality of images. The generated animation keyframes correspond to the distinct period of time in the timeline associated with the respective image. In addition, the animation keyframes are used to provide a description of motion (e.g., an animation) for the respective objects. Furthermore, the distinct period of time is also used to order the presentation of the animated 3D scene. In other words, the presented 3D animation sequence reflects both the scene ordering and animation keyframes generated by associating each of the plurality of images with a distinct period of time in the timeline. The distinct periods of time can be used to generate an animatic. The term "animatic" is used generically to describe a mockup of a sequence of one or more 2D images (e.g., a movie). In addition, the animatic can be exported to generate a 3D animation sequence. Furthermore, the animations presented in the 3D animation sequence are generated without explicitly defining their respective animation keyframes by the user of the application.

Moreover, in some implementations, after animation keyframes and the corresponding 3D animation sequence have been generated, the user can modify the distinct time periods, manipulate objects in the presentations of one or more of the 3D scenes corresponding to any of the plurality of 2D images, or combinations thereof. Any of the modifications to the distinct time periods, manipulations of objects in the presentations of the 3D scene corresponding to any of the plurality of 2D images, or combinations thereof may change the associated keyframe animations and/or the corresponding 3D animation sequence. For example, in reference to FIG. 1B, image 116i has been reordered along the timeline 112, according to the illustrated arrow to occur after image 116e (i.e., at position 119 in the timeline 112). In response, the application can generate new animation keyframes corresponding to the modified timeline 112. As such, when the application generates a 3D animation sequence, the new animation keyframes correspond to the reordered timeline.

As another example, the user can modify one or more manipulations of the objects in the 3D scene and generate a new 2D image using the modified manipulations. In response, the application may generate new animation keyframes and replace the representation of the 2D image in the timeline with a representation of the new 2D image. For example, in reference to FIGS. 1A, 1B, and 1C, if the 3D scene 102 is modified to generate 3D scene 142 a new 2D image is generated from the 3D scene 142. In addition, new animation keyframes are generated corresponding to the representation of objects in the generated image. Moreover, when the application generates the 2D image of the scene 142, a representation replaces the representation 116e in the timeline 112. When the application generates a 3D animation sequence, the generated 3D animation sequence includes the newly generated animation keyframes in the 3D scene 142 instead of the 3D scene 102.

In some implementations, the application displays an onionskin in combination with the presented 3D scene. Used herein "onionskin" is used generically to describe a partially transparent representation of a 2D image that can be combined with a presentation of the 3D scene. In general, an onionskin can be used to display a previous 2D image so the user can efficiently and accurately generate positions and/or poses for objects in the 3D scene. For example, in reference to FIG. 1C, an image corresponding to scene 102 (i.e., image 116e) is presented as a partially transparent representation along with the presentation of the 3D scene 142. In the illustrated example, the user can use the partially transparent representation as a guide when modifying the objects in the presented 3D scene 142. In other words, the user can position and/or pose the objects in the 3D scene while using the partially transparent representation as a reference point to ensure that the presented 3D scene is modified to reflect appropriate differences between the partially transparent representation and the presented 3D scene. In some implementations, instead of combining the partially transparent image with the presented 3D scene, the application can display a representation of a 2D image with the presented 3D scene in a manner that allows a user to compare the two. For example, the application can display the 2D image corresponding to scene 102 (i.e., image 116e) side-by-side with the presented 3D scene 142.

Figure 2:
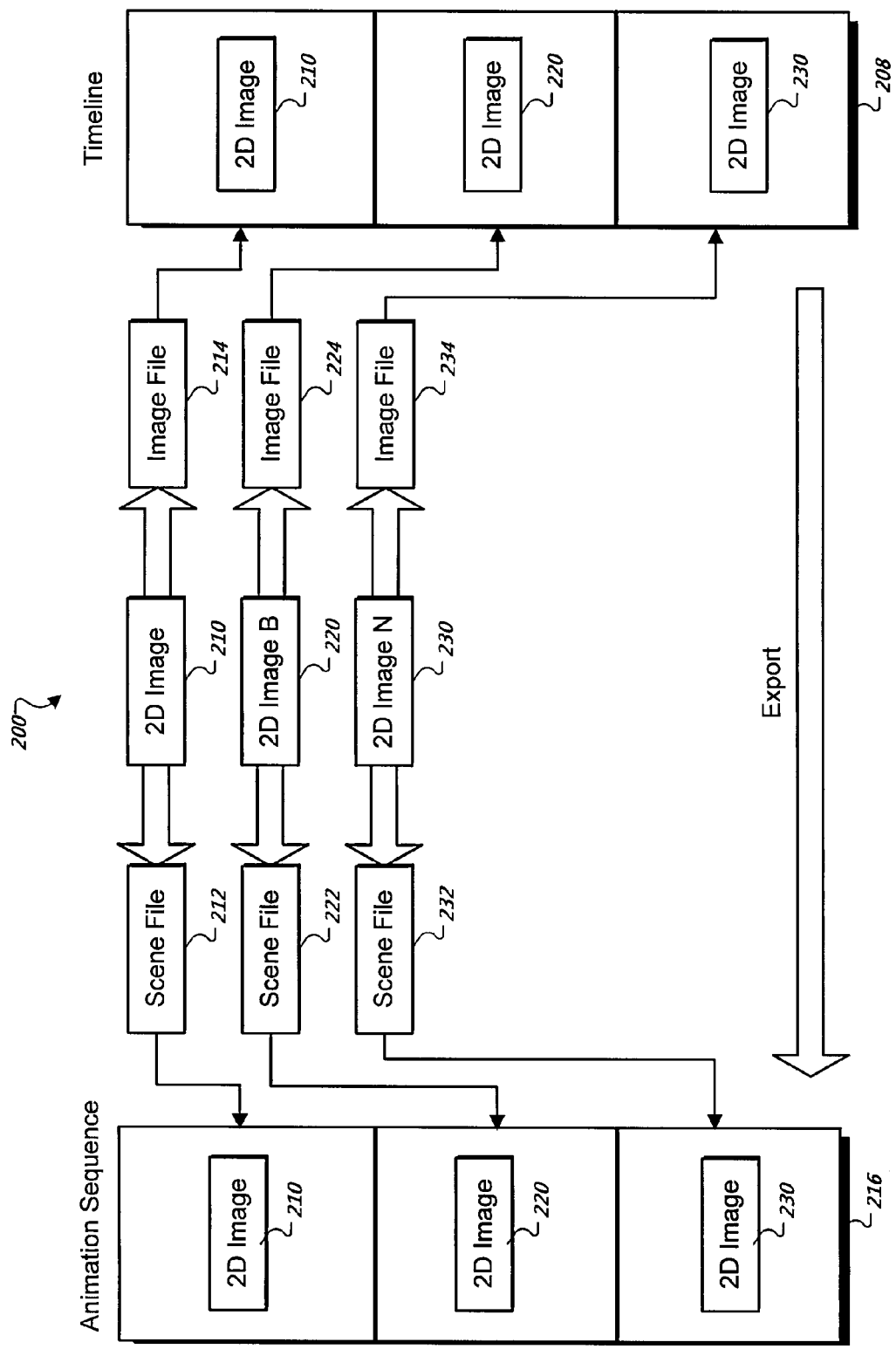
FIG. 2 is a block diagram showing example relationships between 2D images, timing information and a 3D animation sequence.

FIG. 2 is a block diagram 200 showing example relationships between 2D images 210, 220, and 230, a timeline 208 and a 3D animation sequence 216. In general, any number of images can be generated using the example relationships shown in FIG. 2. However, for convenience, FIG. 2 is described with reference to three images 210, 220 and 230 generated by the example application described in reference to FIGS. 1A-1C. In general, when the application generates a 2D image of a 3D scene, the application stores a copy of the current scene in a file on a storage device or in memory. For example, when 2D image 210 is generated, the application stores information associated with the scene to a scene file 212. As another example, when 2D image 210 is generated, the application stores information associated with the scene as metadata of the 2D image 210.

The scene file 212 includes information corresponding to the one or more objects in the scene. For example, information stored in the scene file 212 can include, but is not limited to object positions, object properties, references to files that describe the objects, and the like. In addition, the scene file 212 can include information corresponding to animation keyframe attributes for each object in the scene. For example, in some implementations, animation keyframe attributes can include, but are not limited to position values (e.g., x-axis coordinates, y-axis coordinates, z-axis coordinates, or combinations thereof), intensity values (e.g., light intensity values, sound intensity values, or other intensity values), and directional values (e.g., a direction an object is facing), or other values. As another example, in some implementations, animation keyframe attributes can include delta values that correspond to changes in position, changes in intensity, changes in direction, and the like. Similar techniques can be used to generate scene files 222 and 232 when generating 2D images 220 and 230, respectively. In some implementations, instead of storing the keyframe attributes in the scene file (e.g., scene file 212), the keyframe attributes can be stored in the image metadata. For example, when 2D image 210 is generated, the application stores the keyframe attributes in the metadata of the 2D image 210.

In addition to generating scene file 212, the application also generates a 2D image file from the point of view of a virtual camera in the scene. For example, in reference to FIG. 1A, a camera is used to generate a 2D image file corresponding to the scene 102. In general, the 2D image file specifies the pixel values of the 2D image and can be generated using conventional techniques. Such techniques include, but are not limited to, ray tracing, ray casting, rasterization, or other rendering techniques, to name a few examples. In other words, a 2D image file is a representation of a 2D image that is stored while a 2D image is a representation of a 2D image file that is presented. As such, operations that affect 2D images can also affect 2D image files. For example, if the application associates 2D image 210 with a distinct period of time the application may also associate the corresponding 2D image file 214 with the same distinct period of time, or visa versa. Similar techniques can be used to generate image files 224 and 234 when generating 2D images 220 and 230, respectively.

The application can also associate the 2D images files with the scene files. For example, the metadata of the scene file 212 and the image file 214 can be modified to specify a link between the two. As another example, the application can generate a data structure that specifies a link between the scene file 212 and the image 214. Moreover, the application can associate distinct time periods with each 2D image. For example, the application can associate the 2D images 210, 220, and 230, with distinct time periods in timeline 208. In response, the application can generate an animatic representing the 2D images 210, 220, and 230 according to the timeline 208. In some implementations, a representation of the 2D image file can be used to generate a similar representation in the timeline. For example, the image file 214 can be used to generate a thumbnail image of 2D image 210 in the timeline 208.

The application can also export the 2D images, the generated animatic, or both into a 3D animation sequence 216. In some implementations, the application exports the 2D images into a 3D animation sequence in response to receiving a request from the user or other computing system. For example, in reference to FIG. 1B, the user can select the export button 126 to request that the plurality of 2D images 210, 220, and 230 are used to generate the 3D animation sequence 216. In other implementations, the application exports the 2D images, the distinct periods of time in the timeline, or both automatically. That is, the user's actions may be treated as "live" modifications to the animation sequence. For example, in reference to FIG. 1B, when the user movies image 116i in the timeline, the application automatically exports the new distinct period of time for image 116i. As another example, when the user modifies one or more poses of objects in the scene, the system automatically exports the new pose information. In other words, the application may automatically export information in response to the user's actions.

In general, to generate a 3D animation sequence, the application can access the information in the scene files and generate a 3D animation sequence according to the keyframe attributes contained therein and the distinct time periods in the timeline 208. For example, because there is a link between the scene files 212, 222, and 232 and their respective 2D image files (e.g., image files 214, 224, and 234, respectively) the application can determine animation keyframes from the animation keyframe attributes and the distinct periods of time. In some implementations, the values of the animation keyframe attributes are copied into the 3D animation sequence according to the distinct time periods in the timeline. The copied animation keyframe attributes specify the poses of the respective objects (e.g., the objects from the scene files) in the scene at a particular point in time. Once the 3D animation sequence has been generated, the application can then present the 3D animation sequence to the user.

Figure 3:
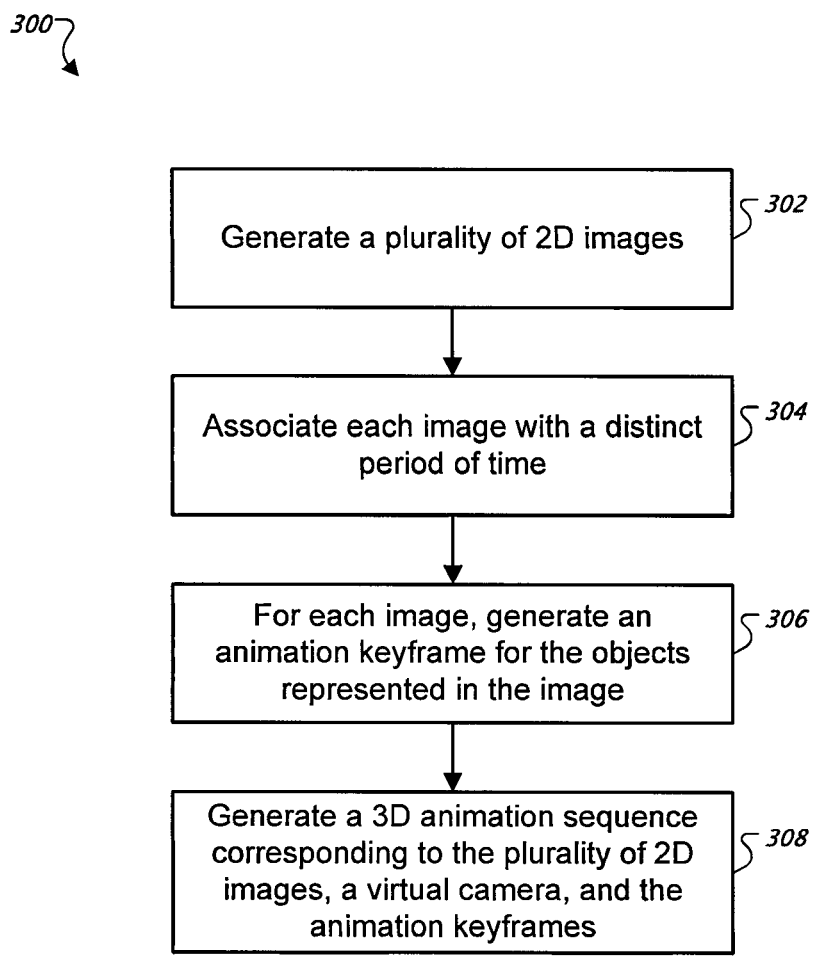
FIG. 3 is a flow chart of an example process for generating a 3D animation sequence from a plurality of 2D images.

FIG. 3 is a flow chart of an example process 300 for generating a 3D animation sequence from a plurality of 2D images. For convenience, process 300 is described in reference to FIG. 1A, FIG. 2, and a system that performs process 300.

In step 302, the system generates a plurality of 2D images. In the example of FIG. 2, the system generates a plurality of images 210, 220 and 220 from presentations of 3D scenes.

In addition, information is associated with each of the 2D images in the plurality. For example, in reference to FIG. 2, objects in the plurality of images 210, 220, and 220 are stored in scene files 212, 222, and 232, respectively. Additionally, the 2D image files 214, 224, and 234 are generated from the 2D images 210, 220, and 230, respectively. Moreover, the image files 214, 224, and 234 are linked with the scene files 212, 222, and 232, respectively.

In step 304, the system associates each image with a distinct period of time. For example, in reference to FIG. 1A when thumbnails of images are arranged in a timeline, the system associates the corresponding 2D image with the distinct period of time in the timeline. In some implementations, steps 302 and 304 can be automated. For example, process 300 can parse a script to determine one or more shots. The process 300 can also parse the script to arrange the objects identified in the shots, take a snapshot of the arrangement, and arrange the plurality of images on a timeline or otherwise assign distinct periods of time for the plurality of images. By way of illustration, the system performing process 300 may be configured to automatically generate certain snapshots according to particular highly utilized camera angles or other standard movie shots. For example, the system performing process 300 may automatically generate snapshots of over-the-shoulder views, close-up views, or when particular characters are near each other, according to one or more automated scripts. These shots may be automatically generated to create a collection of stock images for a particular scene or to capture one or more timing points of a particular scene, to name two examples.

In step 306, the system generates one or more animation keyframes for each image in the plurality of images. For example, in reference to FIG. 2, the system generates animation keyframes for the 2D images 210, 220, and 230 by copying the animation keyframe attributes from the scene files 212, 222, and 232 linked to the respected 2D images. In other words, the timing of the animation keyframes is derived from the timing of the images in the timeline. In one implementation, the animation keyframes that are generated are non-interpolate tangent keyframes, including stepped tangent keyframes. Stepped tangent keyframes specify animations without substantial gradation over time. Alternatively, interpolative tangent keyframes (e.g., linear, or smooth keyframes) specify animations with gradation over time. One example advantage of the non-interpolative tangent approach is that the animations generated with non-interpolative tangents will look identical or substantially similar to the sequence of the plurality of 2D images in the timeline. One example advantage of the interpolative tangent approach is that the motion exhibited by the interpolative tangent is more life-like, and may provide mock-ups that are more accurate. Other conventional keyframe generation techniques can also be used to generate the animation keyframes.

In step 308, the system generates a 3D animation sequence corresponding to the plurality of 2D images, a virtual camera, and the animation keyframes. The system can generate a virtual camera and render the 3D animation sequence from the virtual camera's point of view. In general, for each image in the plurality of images, the system associates the animation keyframes with the objects in the scene files to present the 3D animation sequence. For example, in reference to FIG. 2, the animation keyframes generated for the 2D image 210 are applied to the objects stored in the scene file 212 to generate a portion of the animation sequence 216. In some implementations, the system performing process 300 can derive 3D information between the snapshot points in time, based on the snapshot keyframes. For example, the keyframe information can drive an interpolation and path planning between the animation keyframes.

Figure 4:
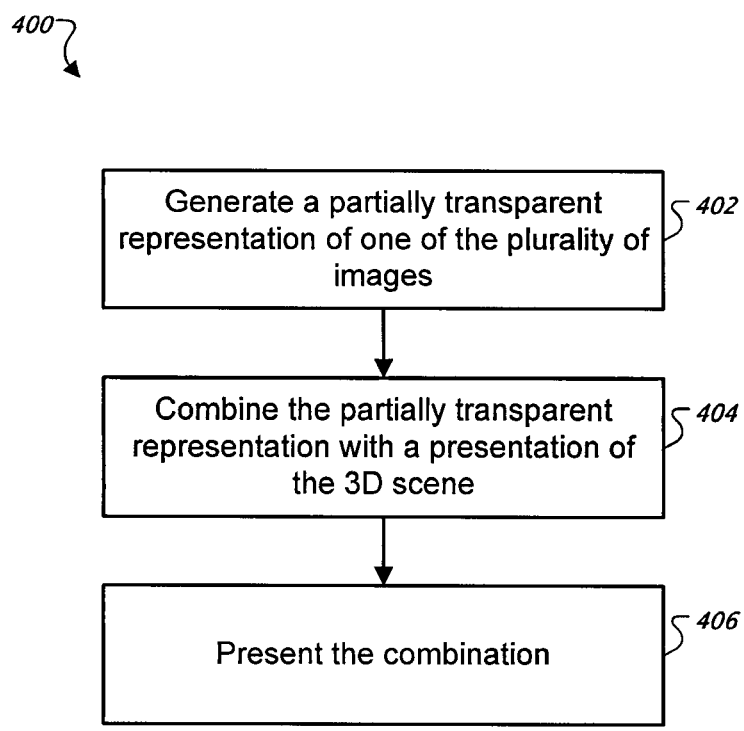
FIG. 4 is a flow chart of an example process for displaying a partially transparent image with a presentation of a 3D scene.

FIG. 4 is a flow chart of an example process 400 for displaying a partially transparent image with a presentation of a 3D scene. In general, process 400 can be performed during the execution of process 300. For example, process 400 can be performed during step 302 of process 300. For convenience, process 400 is described in reference to FIG. 1C and a system that performs process 400.

In step 402, the system generates a partially transparent representation of one of the plurality of images. In the example of FIG. 1C, the system creates a transparent image of the scene 102. In some implementations, the system modifies one or more pixel values of one of the 2D images. For example, the system can modify the alpha channel of the 2D image representing scene 102.

In step 404, the system combines the partially transparent image with a presentation of the 3D scene. In the example of FIG. 1C, the system combines the partially transparent image representing scene 102 with the presentation of 3D scene 142. In some implementations, the system uses a compositing technique to combine the partially transparent representation with the presentation of the 3D scene. Once the partially transparent representation is combined with the representation of the 3D scene, in step 406, the system presents the combination. For example, the system presents the combination to a display device that can display the combination.

Figure 5:
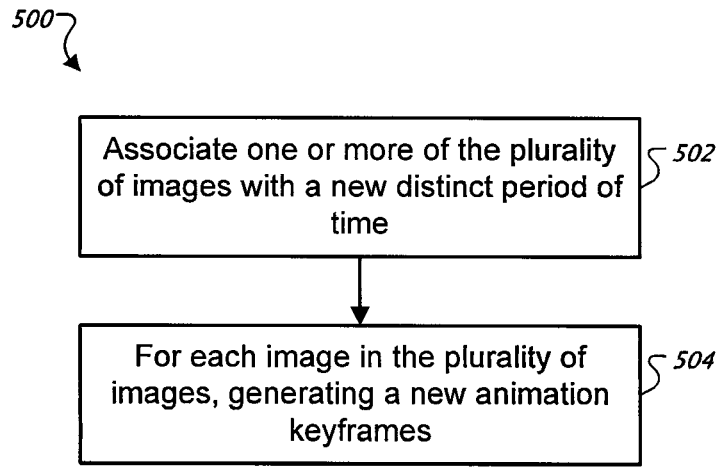
FIG. 5 is a flow chart of an example process for modifying distinct point or periods of time and generating a new 3D animation sequence.

FIG. 5 is a flow chart of an example process 500 for modifying distinct periods of time and generating a new 3D animation sequence. In general, process 500 can be performed after an initial 3D animation sequence has been generated. For example, process 500 can be performed after process 300 generates a 3D animation sequence. For convenience, process 500 is described in reference to FIG. 1B and a system that performs process 500.

In step 502, the system associates one or more of the plurality of images with a new distinct period of time. In the example of FIG. 1B, image 116i is associated with a new distinct period of time at position 119 of the timeline 112. For example, in some implementations, the association can be in response to a user rearranging one or more representations on a timeline. As another example, in some implementations, the association can be in response to a computing system (e.g., the system that performs process 500) rearranging one or more representations of a timeline.

In step 504, the system generates new keyframe animations for each image in the plurality of images. In the example of FIG. 1B, the system generates new keyframe animations for each image 116a-116n. In some implementations, only the images that have modified keyframes are generated. For example, in reference to FIG. 1B, because image 116i is associated with a new distinct period of time at position 119 in the timeline 112, only keyframe animations for image 116i is generated. In such implementations, the previously generated keyframe animations for the other images (e.g., image 116e) can be accessed, determined, or otherwise identified such that they can also be used when generating a 3D animation sequence. After the animation keyframes have been generated or otherwise identified, a new 3D animation sequence corresponding to the new animation keyframes and the new distinct periods of time can be generated and presented. For example, the system can execute step 308 of process 300 to generate the new 3D animation sequence.

Figure 6:
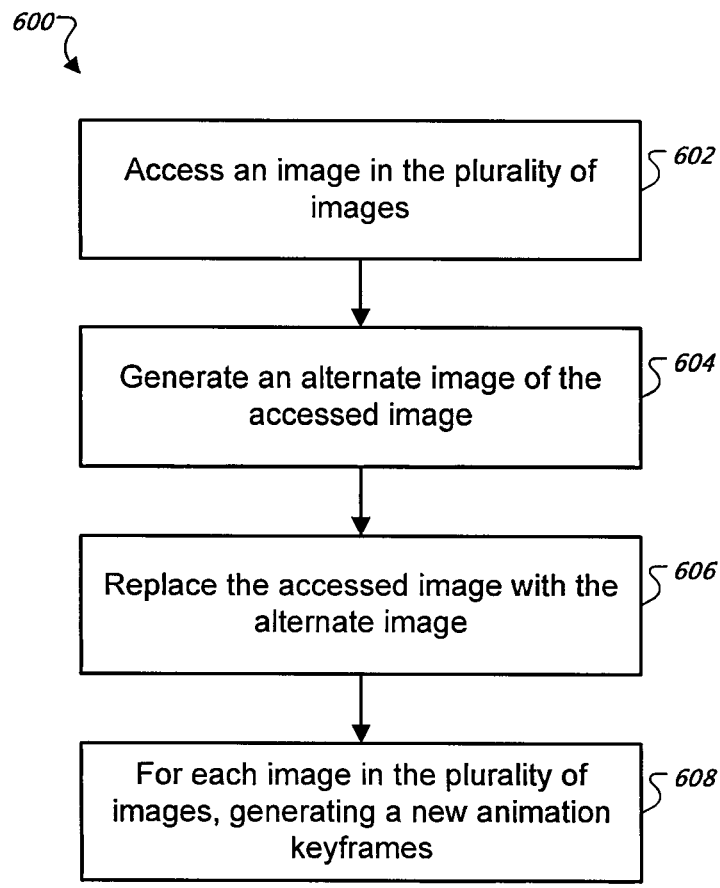
FIG. 6 is a flow chart of an example process for modifying generated images and generating a new 3D animation sequence.

FIG. 6 is a flow chart of an example process 600 for modifying generated images and generating a new 3D animation sequence. In general, process 600 can be performed after an initial 3D animation sequence has been generated. For example, process 600 can be performed after process 300 generates a 3D animation sequence. For convenience, process 600 is described in reference to FIGS. 1B, 1C, 2, and a system that performs process 600.

In step 602, the system accesses an image in the plurality of images. In some implementations, the user can select the image from the timeline. For example, in reference to FIG. 1B, any of the images 116a-116n can be selected by the user. In response, the system can load objects represented in the image can into a 3D scene. For example, in reference to FIG. 2, the appropriate scene file can be accessed, and the information corresponding to the objects contained therein referenced. The information can be used to generate representations of the objects presented in the 3D scene.

In step 604, the system generates an alternate image of the accessed image. In general, the alternate image includes one or more additional manipulations to the objects in the scene. That is, the alternate image includes one or more additional manipulations to the objects in the accessed image. In the example of FIG. 1C, scene 142 includes additional manipulations to the objects that differ from the manipulations to the objects in scene 102.

In addition, the system adds the alternate image to the plurality of images. For example, in reference to FIG. 1B, the system adds an alternate image to the plurality of images 122. In response, in step 606, the system replaces the accessed image with the alternate image in the timeline. For example, the system replaces the image 116e with the alternate image. In other words, while the image 116e is still available to users of the system (e.g., the image still belongs to the plurality of images 122), 116e is removed from the timeline 112, and as such, is not represented in the 3D animation sequence corresponding to the timeline 112 presented in the example of FIG. 1B.

In step 608, the system generates new keyframe animations for each image in the plurality of images. In the example of FIG. 1B, the system generates new keyframes animations for each image 116a-116n. In some implementations, only the images that have modified keyframes are generated. For example, in reference to FIG. 1B because only objects in image 116e have been modified, only keyframe animations for image 116e are generated. In such implementations, the previously generated keyframe animations for the other images 116a-116d and 116f-116n can be accessed, determined, or otherwise identified such that they can also be used when generating a 3D animation sequence. After the animation keyframes have been generated or otherwise identified, the system generates and presents a new 3D animation sequence corresponding to the new animation keyframes and the new distinct periods of time. For example, the system can execute step 308 of process 300 to generate the new 3D animation sequence.

Figure 7:
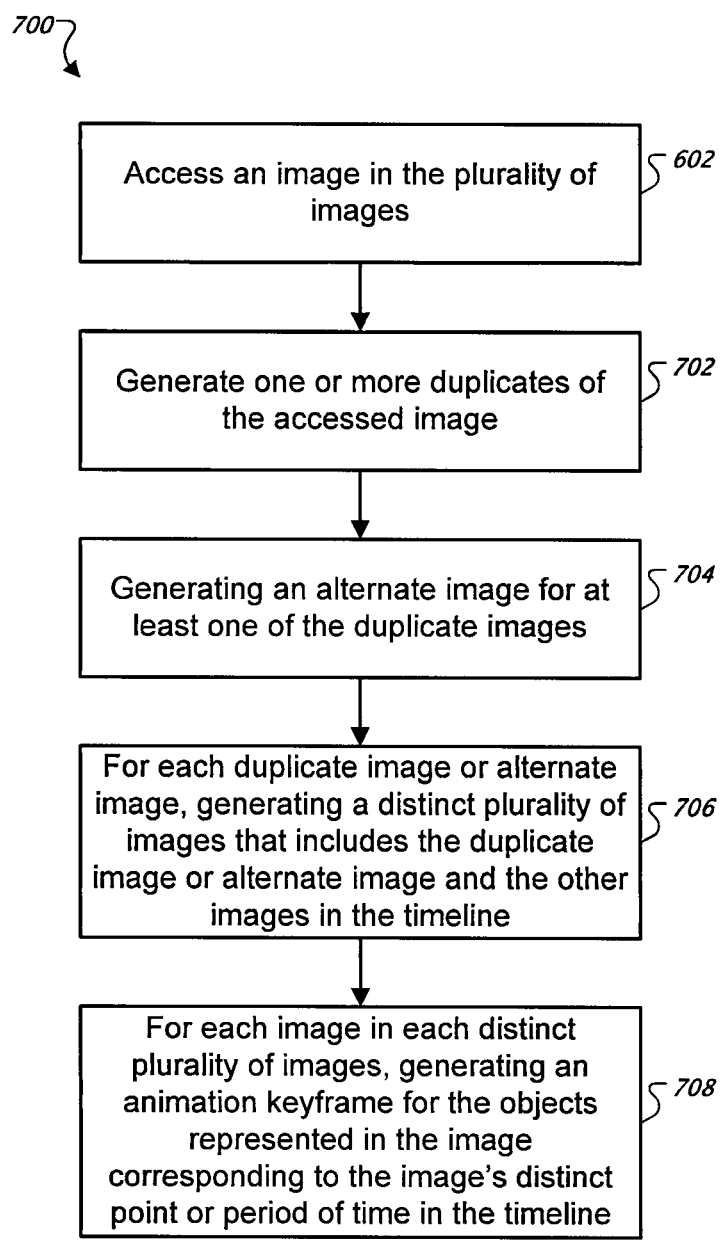
FIG. 7 is a flow chart of an example process for generating one or more duplicate images and generating one or more new 3D animation sequences using the modified duplicate images.

FIG. 7 is a flow chart of an example process 700 for generating one or more duplicate images and generating one or more new 3D animation sequences using the modified duplicate images. For convenience, process 700 is described in reference to FIGS. 1B, 1C, 2, and a system that performs process 700. In general, process 700 may be performed to generate one or more alternative 3D animation sequences or to provide more user control, where the user doesn't want to make a wholesale replacement of one or more of the image snapshots in the timeline (e.g., similar to the process described in reference to FIG. 6). For example, consider a situation where the user generates a snapshot with two characters, but wants one character to have an exaggerated pose in one case, and the current pose in another case. The system can perform process 700 to generate alternative 3D animation sequences where one sequence includes the exaggerated pose, and a second sequence includes the normal pose. In step 602, the system accesses an image in the plurality of images.

In step 702, the system can generate one or more duplicate images from the accessed image. For example, in response to user input, the system can generate one or more copies of the accessed image, and present the copies in the timeline 112 at the identical or substantially similar positions in the timeline as other duplicate images and the accessed image.

In step 704, the system can generate an alternate image for at least one of the duplicate images. In general, at least one of the alternate images include one or more additional manipulations to the objects in the scene. For example, by way of illustration, the user can provide one or more user inputs that specify one or more manipulations that are performed by the system to move the specified character into the exaggerated pose. That is, the alternate image includes one or more additional manipulations to the objects in the duplicate image. In such situations, both the alternate image(s) and the duplicate image may co-exist in the timeline 112.

In step 706, for each duplicate image or alternate image, the system can generate a distinct plurality of images that includes the duplicate image or alternate image and the other images in the timeline. That is, the system can generate one or more distinct plurality of images according to the different snapshot sequences. For example, the system can generate a first plurality of images that includes the exaggerated pose in the snapshot sequence and a second plurality of images that includes the normal pose in the snapshot sequence.

In step 708, for each image in each distinct plurality of images, that system can generate an animation keyframe for the objects represented in the image corresponding to the image's distinct point or period of time in the timeline. That is, the system can generate a collection of animation keyframes for each snapshot sequence. For example, the system can generate animation keyframes for the exaggerated pose, according to the first plurality of images. Furthermore, the system can generate animation keyframes for the normal pose, according to the second plurality of images. That is, keyframes for the exaggerated pose and the normal pose can then be viewed as their own separate 3D animation sequence using techniques described in this specification.

Figure 8:
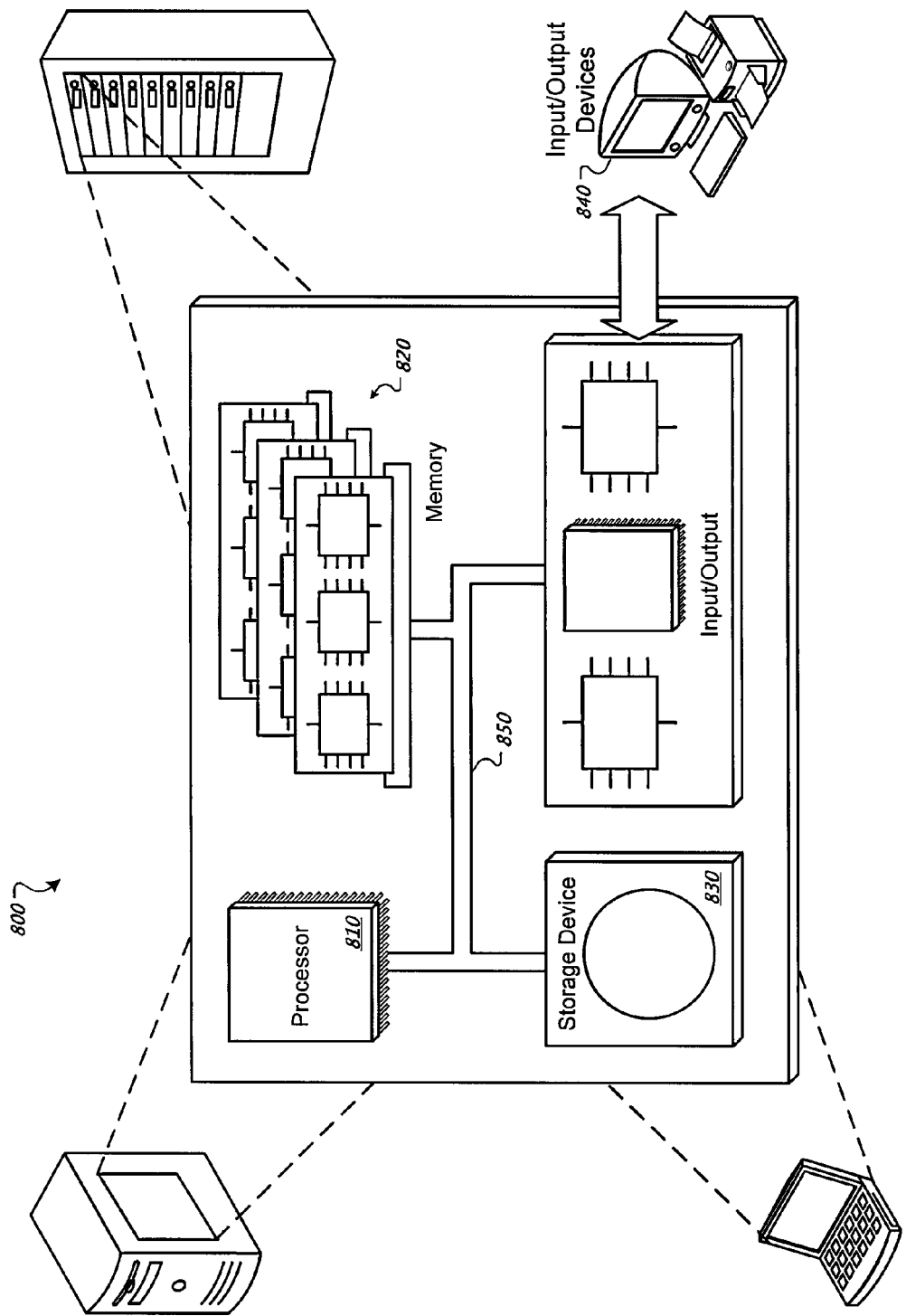
FIG. 8 is a schematic diagram of an example of a generic computer system.

FIG. 8 is a schematic diagram of an example of a generic computer system 800. The system 800 can be used for the operations described in association with the methods 300, 400, 500, and 600 according to one implementation. For example, the system 800 may be configured to include a program product, such as the application described in reference to FIGS. 1A-1C.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

Thus, particular embodiments of the subject matter have been described. Other embodiments are within the scope of the following claims. For example, the actions recited in the claims can be performed in a different order and still achieve desirable results.

What is claimed is:

1. A computer-implemented method comprising:
   presenting a 3D scene to a user, and allowing the user to manipulate at least one or more objects in the 3D scene;
   generating a plurality of animation snapshots representing different manipulations of the 3D scene, wherein each animation snapshot is created from a point of view of a virtual camera in the scene and includes a first file that stores information on positions and properties of objects in the scene and a second file, linked to the first file, that is a representation corresponding to a two-dimensional image of the scene;
   associating each of the plurality of animation snapshots to a timeline;
   generating a plurality of animation keyframes corresponding to the plurality of animation snapshots, where the timing of the animation keyframes is derived from the timeline; and
   generating a 3D animation sequence corresponding to the plurality of animation keyframes.

2. The method of claim 1, wherein generating a plurality of animation keyframes comprises: receiving a request to export keyframe information associated with the plurality of animation snapshots into a 3D environment.

3. The method of claim 1, further comprising:
   generating a partially transparent representation of one of the plurality of animation snapshots; and
   combining the partially transparent representation with a presentation of the 3D scene.

4. The method of claim 1, wherein generating an animation comprises:
   accessing keyframe attributes associated with the 2D image wherein the keyframe attributes associated with the 2D image are based at least in part on the corresponding representation of the 3D scene associated with the 2D image; and
   determining, for the one or more objects in the 2D image an animation keyframe according to the keyframe attributes.

5. The method of claim 4, wherein determining an animation keyframe comprises:
   determining an animation keyframe according to one of a non-interpolative tangent representation or an interpolative tangent representation of the keyframe attributes.

6. The method of claim 4, further comprising:
   generating a 3D animation sequence according to an interpolation of the animation keyframes.

7. The method of claim 4, further comprising:
   generating a 3D animation sequence corresponding to the plurality of 2D images, a virtual camera, and the determined animation keyframes.

8. The method of claim 1, further comprising, after generating the 3D animation sequence:
   associating one or more of the plurality of animation snapshots with a new location in the timeline and generating an alternate timeline; and
   for each animation snapshot in the plurality of animation snapshots, generating a new animation keyframe corresponding to the animation snapshot's location in the alternate timeline.

9. The method of claim 1, further comprising:
   accessing a animation snapshot in the plurality of animation snapshots;
   generating an alternate animation snapshot, wherein generating an alternate animation snapshot includes modifying one or more objects in the accessed animation snapshot;
   replacing the accessed animation snapshot with the alternate image in the timeline; and
   for each animation snapshot in the plurality of animation snapshots, generating an animation keyframe for the objects represented in the animation snapshot corresponding to the animation snapshot's location in the timeline.

10. The method of claim 1, further comprising:
    accessing a animation snapshot in the plurality of images animation snapshots;
    generating one or more duplicate animation snapshots of the accessed animation snapshot;
    generating an alternate animation snapshot for at least one of the duplicate animation snapshots, wherein generating an alternate animation snapshot includes modifying one or more objects in the duplicate animation snapshot;
    for each duplicate animation snapshot or alternate animation snapshot, generating a specified plurality of animation snapshots that includes the duplicate animation snapshot or alternate animation snapshot and the other animation snapshots in the timeline; and
    for each animation snapshot in each specified plurality of animation snapshots, generating an animation keyframe for the objects represented in the animation snapshot corresponding to the animation snapshot's location in the timeline.

11. The computer program product of claim 1, wherein generating an animation further includes operations comprising:
    accessing keyframe attributes associated with the animation snapshot wherein the keyframe attributes associated with the animation snapshot are based in part on the corresponding representation of the 3D scene associated with the animation snapshot; and
    determining, for the one or more objects in the animation snapshot, an animation keyframe according to the keyframe attributes.

12. The computer program product of claim 11, wherein determining an animation keyframe further includes operations comprising:
    determining an animation keyframe according to one of a non-interpolative tangent representation or an interpolative tangent representation of the keyframe attributes.

13. The computer program product of claim 12, further including operations comprising:
    generating a 3D animation sequence according to an interpolation of the animation keyframes.

14. The computer program product of claim 11, further including operations comprising:
    generating a 3D animation sequence corresponding to the plurality of animation snapshot, a virtual camera, and the determined animation keyframes.

15. The method of claim 1, wherein the second file includes pixel values of the two-dimensional image of the scene.

16. A computer program product, encoded on a non-transitory computer-readable medium, operable to cause one or more processors to perform operations comprising:
    presenting a 3D scene to a user, and allowing the user to manipulate at least one or more objects in the 3D scene;
    generating a plurality of animation snapshots representing different manipulations of the 3D scene, wherein each animation snapshot is created from a point of view of a virtual camera in the scene and includes a first file that stores information on positions and properties of objects in the scene and a second file, linked to the first file, that is a representation corresponding to a two-dimensional image of the scene;
    associating each of the plurality of animation snapshots to a timeline;
    generating a plurality of animation keyframes corresponding to the plurality of animation snapshots, where the timing of the animation keyframes is derived from the timeline; and
    generating a 3D animation sequence corresponding to the plurality of animation keyframes.

17. The computer program product of claim 16, wherein generating a plurality of animation keyframes further includes operations comprising:
    receiving a request to export keyframe information associated with the plurality of animation snapshots into a 3D environment.

18. The computer program product of claim 16, further including operations comprising:
    generating a partially transparent representation of one of the plurality of animation snapshots; and
    combining the partially transparent representation with a presentation of the 3D scene.

19. The computer program product of claim 16, further including operations comprising, after generating the 3D animation sequence:
    associating one or more of the plurality of animation snapshots with a new location in the timeline and generating an alternate timeline; and
    for each animation snapshot in the plurality of animation snapshots, generating a new animation keyframe corresponding to the animation snapshot's location in the alternate timeline.

20. The computer program product of claim 16, further including operations comprising:
    accessing a animation snapshot in the plurality of animation snapshots;
    generating an alternate animation snapshot, wherein generating an alternate animation snapshot includes modifying one or more objects in the accessed animation snapshot;
    replacing the accessed animation snapshot with the alternate image in the timeline; and
    for each animation snapshot in the plurality of animation snapshots, generating an animation keyframe for the objects represented in the animation snapshot corresponding to the animation snapshot's location in the timeline.

21. The computer program product of claim 16, further including operations comprising:
    accessing a animation snapshot in the plurality of animation snapshots;
    generating one or more duplicate animation snapshots of the accessed animation snapshot;
    generating an alternate animation snapshot for at least one of the duplicate animation snapshots, wherein generating an alternate animation snapshot includes modifying one or more objects in the duplicate animation snapshot;
    for each duplicate animation snapshot or alternate animation snapshot, generating a specified plurality of animation snapshots that includes the duplicate animation snapshot or alternate animation snapshot and the other animation snapshots in the timeline; and
    for each animation snapshot in each specified plurality of animation snapshots, generating an animation keyframe for the objects represented in the animation snapshot corresponding to the animation snapshot's location in the timeline.

22. A system comprising:
    one or more display devices;
    one or more machine-readable storage devices including a program product; and
    one or more processors operable to execute the program product, interact with the display devices, and perform operations comprising:
    presenting a 3D scene to a user, and allowing the user to manipulate at least one or more objects in the 3D scene;
    generating a plurality of animation snapshots representing different manipulations of the 3D scene, wherein each animation snapshot is created from a point of view of a virtual camera in the scene and includes a first file that stores information on positions and properties of objects in the scene and a second file, linked to the first file, that is a representation corresponding to a two-dimensional image of the scene;
    associating each of the plurality of animation snapshots to a timeline;
    generating a plurality of animation keyframes corresponding to the plurality of animation snapshots, where the timing of the animation keyframes is derived from the timeline; and
    generating a 3D animation sequence corresponding to the plurality of animation keyframes.

23. The system of claim 22, wherein generating a plurality of animation keyframes further includes operations comprising:
    receiving a request to export keyframe information associated with the plurality of animation snapshots into a 3D environment.

24. The system of claim 22, further including operations comprising:
    generating a partially transparent representation of one of the plurality of animation snapshots; and
    combining the partially transparent representation with a presentation of the 3D scene.

25. The system of claim 22, wherein generating an animation further includes operations comprising:
    accessing keyframe attributes associated with the 2D image wherein the keyframe attributes associated with the 2D image are based in part on the corresponding representation of the 3D scene associated with the 2D image; and
    determining, for the one or more objects in the 2D image, an animation keyframe according to the keyframe attributes.

26. The system of claim 25, wherein determining an animation keyframe further includes operations comprising:

determining an animation keyframe according to one of a non-interpolative tangent representation or an interpolative tangent representation of the keyframe attributes.

27. The system of claim 26, further including operations comprising:
    generating a 3D animation sequence according to an interpolation of the animation keyframes.

28. The system of claim 25, further including operations comprising:
    generating a 3D animation sequence corresponding to the plurality of 2D images, a virtual camera, and the determined animation keyframes.

29. The system of claim 22, further including operations comprising, after generating the 3D animation sequence:
    associating one or more of the plurality of animation snapshots with a new location in the timeline and generating an alternate timeline; and
    for each animation snapshot in the plurality of animation snapshots, generating a new animation of the objects represented in the animation snapshot corresponding to the animation snapshot's location in the alternate timeline.

30. The system of claim 22, further including operations comprising:
    accessing a animation snapshot in the plurality of 2D images animation snapshots;
    generating an alternate animation snapshot, wherein generating an alternate animation snapshot includes modifying one or more objects in the accessed animation snapshot;
    replacing the accessed animation snapshot with the alternate image in the timeline; and
    for each animation snapshot in the plurality of animation snapshots, generating an animation keyframe for the objects represented in the animation snapshot corresponding to the location in the timeline.

31. The system of claim 22, further including operations comprising:
    accessing a animation snapshot in the plurality of 2D images;
    generating one or more duplicate animation snapshots of the accessed animation snapshot;
    generating an alternate animation snapshot for at least one of the duplicate animation snapshots, wherein generating an alternate animation snapshot includes modifying one or more objects in the duplicate animation snapshot;
    for each duplicate animation snapshot or alternate animation snapshot, generating a specified plurality of animation snapshots that includes the duplicate animation snapshot or alternate animation snapshot and the other animation snapshots in the timeline; and
    for each animation snapshot in each specified plurality of animation snapshots, generating an animation keyframe for the objects represented in the animation snapshot corresponding to the animation snapshot's location in the timeline.

32. The system of claim 22, wherein the second file includes pixel values of the two-dimensional image of the scene.

* * * * *